United States Patent
Meckenstock et al.

(10) Patent No.: US 10,549,784 B2
(45) Date of Patent: Feb. 4, 2020

(54) BRAKE BOOSTER DEVICE HAVING A DEFORMABLE ACTUATOR

(71) Applicant: Ford Global Technologies, LLC, Dearborn, MI (US)

(72) Inventors: Daniel Meckenstock, Wuppertal (DE); Marius Sawatzki, Pulheim (DE); Istvan Somogyvari, Cologne (DE); Michael Spurling, Romford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 155 days.

(21) Appl. No.: 15/959,677

(22) Filed: Apr. 23, 2018

(65) Prior Publication Data

US 2019/0009768 A1    Jan. 10, 2019

(30) Foreign Application Priority Data

Jul. 4, 2017   (DE) .................. 10 2017 211 339

(51) Int. Cl.
| | |
|---|---|
| *B62D 21/15* | (2006.01) |
| *B60T 7/06* | (2006.01) |
| *B62D 25/08* | (2006.01) |
| *B60L 3/00* | (2019.01) |

(52) U.S. Cl.
CPC .......... *B62D 21/152* (2013.01); *B60L 3/0007* (2013.01); *B60T 7/065* (2013.01); *B62D 25/082* (2013.01); *B60Y 2306/01* (2013.01)

(58) Field of Classification Search
None
See application file for complete search history.

(56) References Cited

U.S. PATENT DOCUMENTS

| | | | | |
|---|---|---|---|---|
| 4,266,630 | A * | 5/1981 | Nilsson ................ | B60K 5/1208 180/291 |
| 6,041,674 | A * | 3/2000 | Kato ...................... | B60R 21/09 180/274 |
| 6,269,900 | B1 * | 8/2001 | Adams .................. | B60R 21/09 180/274 |
| 7,195,091 | B2 * | 3/2007 | Rixon .................... | B60T 7/065 180/274 |
| 7,740,278 | B2 * | 6/2010 | Kakuta .................. | B62D 3/12 280/777 |
| 2007/0283690 | A1 * | 12/2007 | Miller .................... | B60R 21/09 60/547.1 |
| 2013/0333376 | A1 * | 12/2013 | Murayama ............. | B60T 7/042 60/545 |
| 2017/0253220 | A1 * | 9/2017 | Ishihara ................. | G05G 1/32 |
| 2018/0229771 | A1 * | 8/2018 | Sekine .................... | B60K 1/00 |

(Continued)

FOREIGN PATENT DOCUMENTS

| | | |
|---|---|---|
| DE | 202010017605 | 10/2012 |
| DE | 202017104333 | 8/2017 |

*Primary Examiner* — Drew J Brown
(74) *Attorney, Agent, or Firm* — Vichit Chea; Carlson, Gaskey & Olds, P.C.

(57) ABSTRACT

An exemplary brake booster device includes, among other things, a brake booster mounted on a vehicle component, and an actuator that, in response to a force applied to the actuator by a gearbox housing, pivots to move the brake booster upward. The actuator includes at least two pivot elements spaced from each other, and a displacement mounted in a jointed manner between the at least two pivot elements.

20 Claims, 6 Drawing Sheets

(56) References Cited

U.S. PATENT DOCUMENTS

2019/0009767 A1* 1/2019 Meckenstock .......... B60T 17/18
2019/0009768 A1* 1/2019 Meckenstock .......... B60T 7/065
2019/0039588 A1* 2/2019 Somogyvari ........... B60T 17/00

* cited by examiner

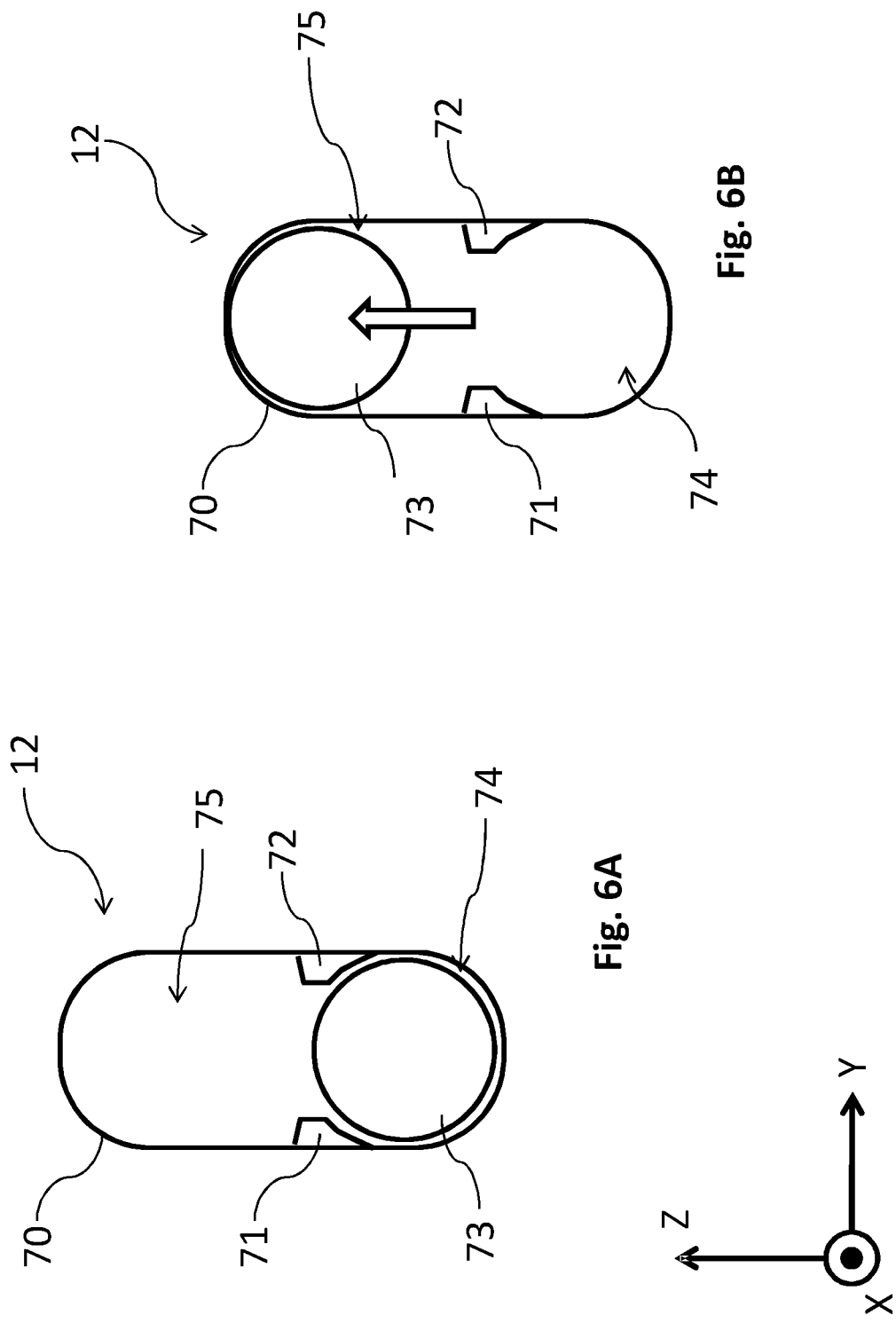

BRAKE BOOSTER DEVICE HAVING A DEFORMABLE ACTUATOR

CROSS-REFERENCE TO RELATED APPLICATIONS

This application claims priority to German Patent Application No. 102017211339.1, which was filed on Jul. 4, 2017 and is incorporated herein by reference in its entirety.

TECHNICAL FIELD

This disclosure relates generally to a brake booster mounted on a vehicle component via at least one fastening point.

BACKGROUND

Motor vehicles can be equipped with brake boosters for boosting the pedal force. Low-pressure brake boosters can be used. However, motor vehicles can also be provided with electric brake boosters. Electric brake boosters can be particularly advantageous for use in electric vehicles and hybrid vehicles. In electric brake boosters, the pulse of the brake pedal can be used for inducing the alternating voltage of a coil to release kinetic energy through the combination of coil and core. The kinetic energy supports the brake force of the pedal. DE Patent No. 202010017605 describes an exemplary electric brake booster.

Gearboxes for hybrid vehicles conventionally have relatively large dimensions since they contain components and functions that are not required by gearboxes for vehicles having only an internal combustion engine. For example, the gearbox of a hybrid vehicle can have components and functions making it possible to switch between the different drive types (e.g., electric and internal combustion engine). The electric motors and the necessary additional gearbox units can also be accommodated within the gearbox housing.

If a large gearbox with an associated housing and an electric brake booster are used in a hybrid vehicle, a direct force connection between the gearbox housing and the brake booster system can be produced during a frontal impact due to the packaging of the gearbox housing and the electric brake booster system in the X direction. However, this can lead to undesirable deformations of the bulkhead, to a displacement of the brake pedal, and to deformations of the dashboard carrier. The steering column can also move.

SUMMARY

A brake booster device according to an exemplary aspect of the present disclosure includes a brake booster mounted on a vehicle component via at least one fastening point, and a deformable actuator which is formed by at least two pivot elements and a displacement element. The two pivot elements are mounted at a spacing from one another on a vehicle component such that they are pivotable about respective rotary axes extending in a Y direction. The displacement element is mounted in a jointed manner between the two pivot elements. The actuator is configured to pivot about the rotary axes of the two pivot elements under a force effect in an X direction resulting from a gearbox housing. The actuator pivots to apply a force to the brake booster in a Z direction, as a result of which the position of the brake booster is alterable. The actuator is mounted below the brake booster and applies an upward force to the brake booster in the Z direction during the pivoting.

In another example of the foregoing device, the brake booster is rotated about a tilting axis in the Y direction as a result of the force of the actuator.

In another example of any of the foregoing devices, the tilting axis is located at a fastening point of the brake booster on the vehicle component.

In another example of any of the foregoing devices, the brake booster is displaced in the Z direction as a result of the force of the actuator.

In another example of any of the foregoing devices, the brake booster is displaced along a surface of the vehicle component on which the at least one fastening point is located.

In another example of any of the foregoing devices, a pivot element of the actuator has an angled design providing a contact surface to make contact with the brake booster.

Another example of any of the foregoing devices includes a plurality of rotary joints between the displacement element and the pivot elements, a plurality of rotary axes between the pivot elements and the vehicle component, or both, that are formed by material portions having a rigidity which is lower than the rigidity of the pivot elements, the displacement element, or both.

Another example of any of the foregoing devices includes the at least one fastening point formed by an elongated hole having two lateral narrowed portions through which the elongated hole is divided into two mutually adjacent hole regions. The longitudinal extent of the elongated hole extends in the Z direction and, upon the application of a force to the brake booster in the Z direction, a screw connection moves from a first hole region into a second hole region with a widening of the narrowed portions.

A method, according to another exemplary aspect of the present disclosure includes pivoting a deformable actuator which is formed by at least two pivot elements and a displacement element. The two pivot elements are mounted at a spacing from one another on a vehicle component such that they are pivotable about rotary axes. The displacement element is mounted in a jointed manner between the two pivot elements. The pivoting about the rotary axes of the two pivot elements in response to a force applied by a gearbox housing in an X direction. The method further includes, during the pivoting, using the actuator to apply a force in a Z direction to a module mounted on a bulkhead to alter a position of the module mounted on the bulkhead.

In another example of the foregoing method, the X direction is horizontal and the Z direction is vertical.

In another example of any of the foregoing methods, the application of the force in the Z direction by the actuator to the module displaces the module in the Z direction.

In another example of any of the foregoing methods, the module is a brake booster.

In another example of any of the foregoing methods, the module remains attached to the bulkhead when the position of the module is altered by the actuator applying the force in the Z direction to the module.

A brake booster device according to yet another exemplary aspect of the present disclosure includes, among other things, a brake booster mounted on a vehicle component and an actuator. In response to a force applied to the actuator by a gearbox housing, the actuator pivots to move the brake booster upward. The actuator includes at least two pivot elements spaced from each other and a displacement mounted in a jointed manner between the at least two pivot elements.

In another example of the foregoing device, at least two pivot elements are pivotably connected to a vehicle component such that the at least two pivot elements are pivotable relative to the vehicle component about respective rotatory axes extending in a Y direction.

In another example of any of the foregoing devices, the force applied to the actuator is in a horizontal force in an X direction.

In another example of any of the foregoing devices, the vehicle component is a bulkhead.

In another example of any of the foregoing devices, the brake booster is rotated about a rotary axis in the Y direction in response to the upward movement of the actuator.

In another example of any of the foregoing devices, the brake booster slides upwards relative to the vehicle component in response to the upward movement of the actuator.

In another example of any of the foregoing devices, the brake booster is displaced in a Z direction as a result of the force of the actuator.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 6A illustrates an embodiment of a fastening point in normal operation;

FIG. 6B illustrates an embodiment of a fastening point after the deflection of a brake booster.

DETAILED DESCRIPTION

Figure 1:
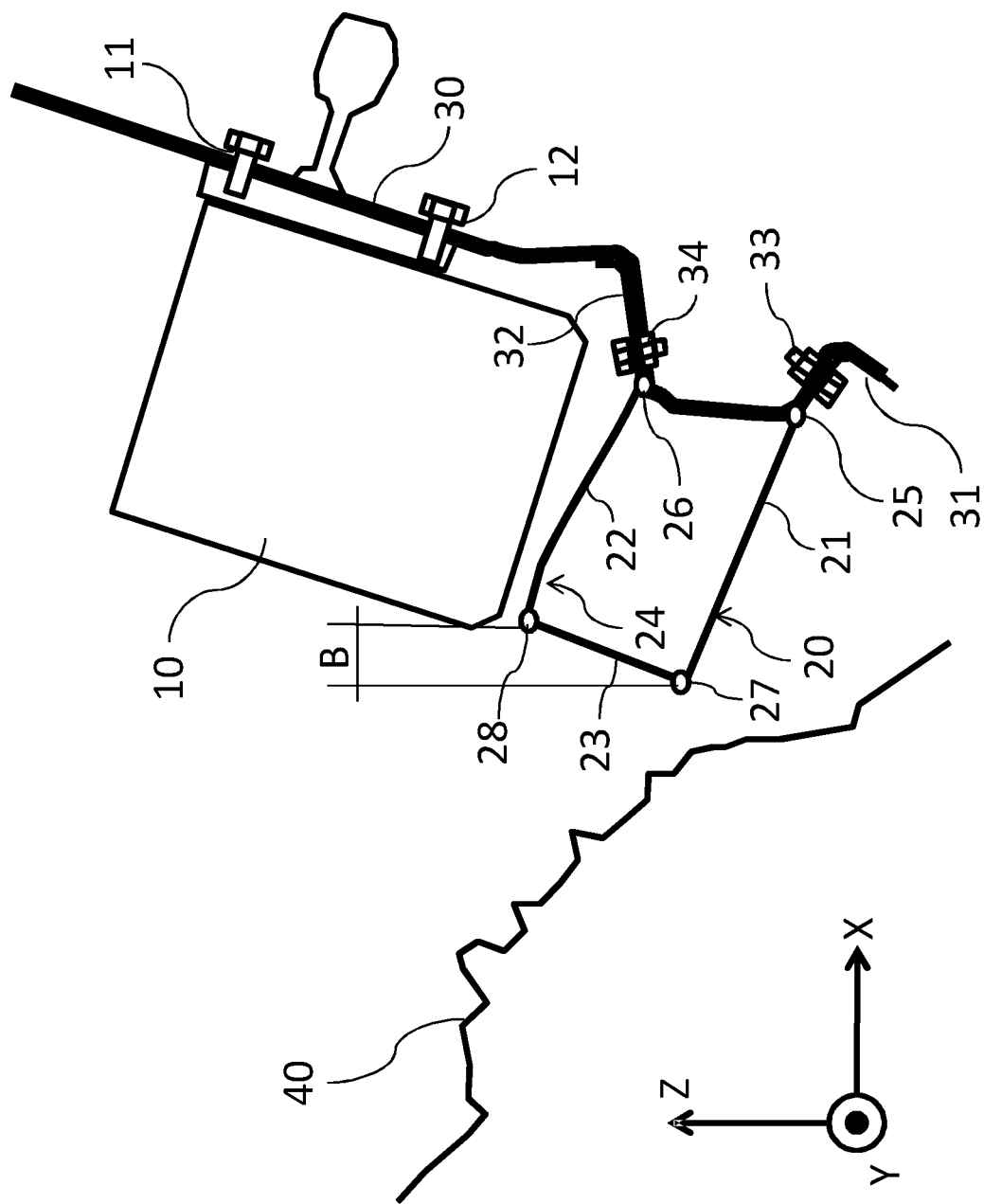
FIG. 1 illustrates a schematic side view of a gearbox housing and a brake booster with an actuator in normal operation.

The disclosure is generally directed toward providing a brake booster device that responds to a frontal impact to a vehicle. The brake booster device can be particularly appropriate for electric brake boosters used in combination with a large gearbox.

In an exemplary non-limiting embodiment of this disclosure, a brake booster is mounted on a vehicle component via at least one fastening point. The brake booster can be an electric or electromechanical brake booster. The brake booster can be mounted on a bulkhead of a motor vehicle. This takes place via at least one fastening point which can be designed for example as a screw connection. A plurality of fastening points can be provided. However, other modules (e.g. ESP modules) fastened to the bulkhead can also be moved from their position.

The brake booster device includes a deformable actuator, which can be formed by at least two pivot elements and a displacement element. The two pivot elements here are mounted at a spacing from one another on a vehicle component such that they are pivotable about rotary axes extending in a Y direction, whilst the displacement element is mounted in a jointed manner between the two pivot elements. The actuator here can likewise be mounted on the bulkhead. However, it can also be assembled on other vehicle components.

The actuator is deformable in that its elements can alter their position with respect to one another under a force effect of a certain magnitude. However, the elements themselves do not substantially deform. Instead, the elements are rigid and stiff enough to be able to withstand the forces which occur and transmit forces to the brake booster. The actuator is designed in particular to pivot about the rotary axes of the two pivot elements under a force effect in an X direction resulting from a gearbox housing, whereby the actuator applies a force to the brake booster in a Z direction. As a result the position of the brake booster can be altered. The X direction here represents the longitudinal direction of the motor vehicle in the vehicle coordinate system, whilst the Z direction represents the vertical. The Y direction corresponds to the transverse direction of the vehicle.

The actuator of the brake booster device according to an exemplary embodiment is arranged and designed such that it exerts a force on the brake booster in the Z direction when forced in the X direction by a gearbox housing. As a result of this force in the Z direction, the brake booster is moved out of the X load path in the Z direction.

In an exemplary embodiment, the brake booster can be moved upward in the Z direction and can slide along the upper side of the gearbox housing. The actuator can be pivotably mounted below the brake booster, and can pivot to apply an upward force to the brake booster in the Z direction. The rotary axes of the pivot elements of the actuator then extend in the Y direction so that the actuator can pivot upwards.

In the event of a frontal impact, the housing of a gearbox of the motor vehicle can be moved toward the brake booster in the X direction. In response, the gearbox housing can impact against the actuator, which is thus pivoted about the rotary axes of the pivot elements thereby exerts a force on the brake booster in the Z direction. The actuator is therefore pivoted out of a normal position, in which it does not apply a force to the brake booster, into an activated position in which it pushes the brake booster away in the Z direction. The actuator here can already be in contact with the brake booster in the normal position. The required contact can result from the pivotal movement.

The position of the brake booster can be altered in different ways as a result of the deformation and pivotal movement of the actuator. In one embodiment of the invention, the brake booster is rotated about a tilting axis, which extends in the Y direction, as a result of the force of the actuator. This tilting axis is formed in particular on the vehicle component on which the brake booster is mounted, e.g. on the bulkhead. For example, such a tilting axis is formed at a fastening point of the brake booster on the vehicle component. It can also be formed by two fastening points.

The actuator then applies a force to the brake booster in the Z direction, which brings about a rotation of the brake booster about this tilting axis. The tilting axis here is preferably selected such that the underside of the brake booster is rotated into a position in which the gearbox housing can move in the form of a wedge under the brake booster or the underside of the brake booster can slide along the upper side of the gearbox housing. The side of the brake booster which faces the gearbox housing is therefore raised as a result of the rotation.

The tilting axis can be located in the lower, central or upper region of the brake booster. The twisting of the brake booster can furthermore bring about or require that the fastening points become detached or at least deformed. The bulkhead may have to deform so that the brake booster can rotate about a horizontal tilting axis which is formed on the bulkhead. Although the brake booster then partially penetrates into the bulkhead, deep penetration of the brake booster into the passenger compartment does not take place since the gearbox housing and the brake booster do not form a package in the X direction.

In another embodiment of this disclosure, the brake booster is linearly displaced in the Z direction as a result of the force of the actuator. The brake booster is therefore pushed upwards in its entirety. For example, the brake booster here can be displaced along a surface of the vehicle component on which the at least one fastening point is located. If this vehicle component is the bulkhead, the brake booster is displaced upwards along this bulkhead. If the bulkhead is sloped, the displacement also has components in the X direction in addition to components in the Z direction.

This displacement of the brake booster can also bring about or require that fastening points become detached or at least deformed. Fastening points can inevitably give way here or they are specially constructed to enable a displacement of the brake booster as of a certain force component in the Z direction. In one embodiment of this disclosure, it is for example provided that at least one fastening point is formed by an elongated hole having two lateral narrowed portions through which the elongated hole is divided into two mutually adjacent hole regions. The longitudinal extent of the elongated hole extends in the Z direction here and, upon the application of a force to the brake booster in the Z direction, a screw connection moves from a first hole region into a second hole region with a widening of the narrowed portions. The brake booster can thus be displaced in a controlled manner without a screw connection detaching completely.

The actuator is formed by a plurality of elements which alter their position with respect to one another during the pivotal movement of the actuator. The elements can include at least two elements, which can be referred to as pivot elements since they are pivotably mounted on a vehicle component such as the bulkhead. These pivot elements are mounted at a spacing from one another on the vehicle component. These pivot elements are preferably arranged above one another. The two pivot elements are connected to one another in their pivotable regions via at least one further element, which is referred to as a displacement element since its position is displaced during the pivotal movement of the actuator. To this end, the displacement element is connected in a jointed manner to the pivot elements.

The actuator can be arranged such that the gearbox housing impacts against a lower pivot element in the event of a frontal impact and pivots this pivot element upwards. To this end, the lower pivot element projects from the vehicle component in the direction of the gearbox housing, wherein it is directed upwards at a slope from the vehicle component. The displacement element extends at a slope and, more precisely, extends upwardly inclined in the direction of the vehicle component. The lower rotary joint is therefore located nearer to the gearbox housing than the upper rotary joint. The gearbox housing thus impacts against the sloping pivot element from below in the region of the rotary joint, whereby the pivot element is pivoted upwards about its rotary axis. The upper pivot element likewise projects upwards at a slope from the vehicle component. The displacement element connects these two pivot elements such that a pivotal movement of the lower pivot element brings about a simultaneous pivotal movement of the upper pivot element. The displacement element is displaced upwards here and toward the vehicle component. The actuator can therefore fold during the pivotal movement without the elements becoming deformed. The dimensions of the elements and the angles between them are selected accordingly. In particular, the rotary axes of the pivot elements and the rotary joints between the pivot elements and the displacement element can form a parallelogram.

The individual elements of the actuator can be formed by rods, tubes, profiles, plates or other rigid members. The elements are designed to be so rigid and stable that they withstand the forces which occur and do not deform. To this end, the elements are preferably designed to be high strength, e.g., consisting of steel, sheet metal, aluminum, forged members. The jointed connection of these elements to one another or to another vehicle component such as the bulkhead can be implemented in various ways. For example the connections can be joints having a degree of freedom such as that seen in hinges. A jointed connection can therefore be formed for example by a bolt which is guided through two bushings.

The connection of two elements can, however, also be produced via a material portion having a rigidity which is lower than the rigidity of the mutually connected components. For example, a first element and a second element of the actuator can be formed by a plate or a profile made from metal, which is kinked between the two elements. In this kinked region, the rigidity of the metal is lower than in the region of the two elements. In normal operation, the actuator retains its shape and the position of the elements of the actuator is not altered. However, when a force effect is introduced in the X direction by a gearbox housing, the connecting regions having the lower rigidity give way and the position of the elements with respect to one another can alter.

Material portions of this type which have a lower rigidity can be used both in the connection of the displacement element to the pivot elements and in the connection of the pivot elements to a vehicle component. For example, in one embodiment of this disclosure, it is provided that the rotary joints between the displacement element and the pivot elements and/or the rotary axes between the displacement elements and the vehicle component are formed by material portions having a rigidity which is lower than the rigidity of the pivot elements or the displacement element.

If a rotary axis between a pivot element and a vehicle component is formed by a material portion having a lower rigidity, a reinforcing element securely fixed to the vehicle component can be provided. The reinforcing element and the pivot element are then formed by a common member which is, however, kinked in the region of the rotary axis. In this kinked portion, the rigidity of the material of the member is lower than in the material portions that form the pivot element and the reinforcing element. If a force is exerted on the actuator in the X direction by a gearbox housing, the material portion having the low rigidity deforms. A rotary axis is thus generated, about which the pivot element can be pivoted. The reinforcing element on the vehicle component can likewise be formed by a rod, a tube, a profile, a plate or other members. In this case, the fastening of the reinforcing element on the vehicle component is located very near to the rotary axis to be generated in order to bring about defined folding in this region.

In one embodiment of the present disclosure, the actuator is formed by a continuous member, which is kinked at a plurality of points to thus form the individual elements of the actuator. Under a force effect in the X direction, the member folds at the kinked points. For example, a rod or a plate can be kinked a plurality of times and mounted by its free ends on a vehicle component. Kinked regions having a lower rigidity are located in each case in the region of the vehicle component to form two rotary axes for the pivot elements. In the further extent of the member, two further kinked regions having a lower rigidity are provided to form rotary joints. Between such a rotary joint and the vehicle component, the member then forms a respective pivot element, whilst it forms the displacement element between the two rotary joints. It is thus possible to form an actuator from a continuous member in a simple manner, the individual portions of which alter their position with respect to one another under a force effect in the X direction.

In an alternative embodiment of the present disclosure, individual elements of the actuator are formed by mutually separate members that are connected to one another via hinge joints. Combinations of hinge joints and material portions having a lower rigidity can also be used. If hinge joints are used, these are constructed such that they do not permit a rotation of the mutually connected elements in normal operation. This can be realized by latching or blocking elements, for example, which become detached or destroyed under a certain force effect in the X direction. A clamping force within a hinge can furthermore be selected to be correspondingly high. As a result of the force effect of the gearbox housing, the clamping force is overcome and two elements can be twisted with respect to one another in the joint.

In the normal position, the actuator is therefore securely held and does not deform, which means that it does not become substantially worn during operation of the vehicle and it does not generate any undesired noises. Under a force effect from a gearbox housing in the X direction, the actuator deforms and moves such that the force effect in the X direction is converted into a force on the brake booster in the Z direction. The gearbox housing then slides along the actuator or vice versa. The arrangement of the elements of the actuator is selected such that the force generated by the actuator on the brake booster in the Z direction is sufficiently high to alter the position of the brake booster. This does not have to be a force solely in the Z direction; rather, the force of the actuator on the brake booster can also have components in the X direction.

In a possible embodiment of the present disclosure, a pivot element has an angled design that forms a contact surface for making contact with the brake booster. To this end, the angled portion of the pivot element has a reflex angle on the side facing the brake booster. If the actuator is pivoted in the direction of the brake booster, it makes contact with the brake booster via the contact surface and thus pushes the brake booster away. The contact surface is designed to be correspondingly large. The region of the actuator which makes contact with the gearbox housing in the event of a frontal collision is preferably wide enough to produce sufficient overlapping with the gearbox in the Y direction for ensuring reliable contact with the gearbox housing. This region is furthermore sufficiently large, and the actuator is sufficiently stable in its bearing region on the vehicle component, to also be able to compensate moments that are generated by forces along the sides.

Therefore, a brake booster, together with an actuator and the fastening of the brake booster on a vehicle component, forms a brake booster device that can advantageously be used in a motor vehicle. In the event of a frontal impact, a force of the gearbox housing in the X direction can be converted by the device into a force in the Z direction, which advantageously pushes the brake booster upward. The brake booster can be rotated or displaced here. A combination of both movements is also possible. The load path in the X direction from the gearbox housing to the brake booster is therefore advantageously interrupted. The deformation of the bulkhead is slight and the brake pedal and the steering column are likewise not displaced, or are only slightly displaced, in the direction of the passenger compartment. This increases the safety of the occupants in the event of a frontal impact.

The features of some of the exemplary embodiments are particularly suitable for use with large gearboxes having large gearbox housings, as are typically used in hybrid vehicles. It is furthermore particularly suitable for use with electric brake boosters, which are likewise used in hybrid vehicles. The exemplary embodiments can be used particularly advantageously here owing to the size and arrangement of these vehicle components, although it can also advantageously be used with other combinations of gearboxes and modules assembled on the bulkhead (brake boosters, ESP modules, etc.).

Another exemplary aspect of the present disclosure can includes a motor vehicle having an embodiment of the brake booster device. This relates in particular to a hybrid vehicle having a gearbox which is designed to switch between an electric drive and another drive type. For purposes of this disclosure, a frontal impact involves any impact, i.e. accident, in which a correspondingly acting force component is generated.

With reference to FIG. 1, an exemplary brake booster 10 is part of a brake booster device having an actuator. In this example, the brake booster 10 is an electric brake booster. The view of FIG. 1 represents a view of the brake booster 10 in the Y direction of a motor vehicle. The brake booster 10 is fastened to the bulkhead 30 of the motor vehicle and is connected in a known manner with a brake pedal and a brake system of the motor vehicle.

The brake booster 10 is mounted on the bulkhead 30 via at least one fastening point. By way of example, two fastening points 11 and 12 located above one another are shown, which are formed by screw connections. To the right of the bulkhead 30, there is the vehicle compartment with the footwell of the driver. The bulkhead 30 here is merely illustrated schematically and can be designed in known ways.

An actuator 20 is mounted below the brake booster 10. This actuator is formed substantially by two pivot elements 21 and 22 and a displacement element 23. The two pivot elements 21, 22 project upwardly at a slope from the bulkhead 30 and are pivotably supported on this in rotary axes 25 and 26. The displacement element 23 connects the two pivot elements 21, 22 to one another. This connection is designed in a jointed manner via respective rotary joints 27 and 28.

A respective reinforcing element 31 and 32 is provided for mounting the pivot elements 21, 22 on the bulkhead 30. These reinforcing elements 31, 32 are securely fixed to the bulkhead 30 via two or more screw connections 33 and 34. The screw connections 33, 34 are located closely adjacent to the rotary axes 25, 26 of the pivot elements 21, 22. The rotary axes 25, 26 extend in the Y direction here. In this embodiment of this disclosure, the rotary axes 25, 26 are formed by material portions which have a lower rigidity than the material of the reinforcing elements 32, 33 and the pivot elements 21, 22. By way of example, these elements can be formed by sheet metal profiles which are bent or folded in the region of the rotary axes 25, 26. However, the material rigidity at these bend points is sufficiently high to hold the actuator 20 in this position. In normal operation of the vehicle, the pivot elements 21, 22 therefore project upwards at a slope from the bulkhead 30, as shown in FIG. 1.

Figure 2:
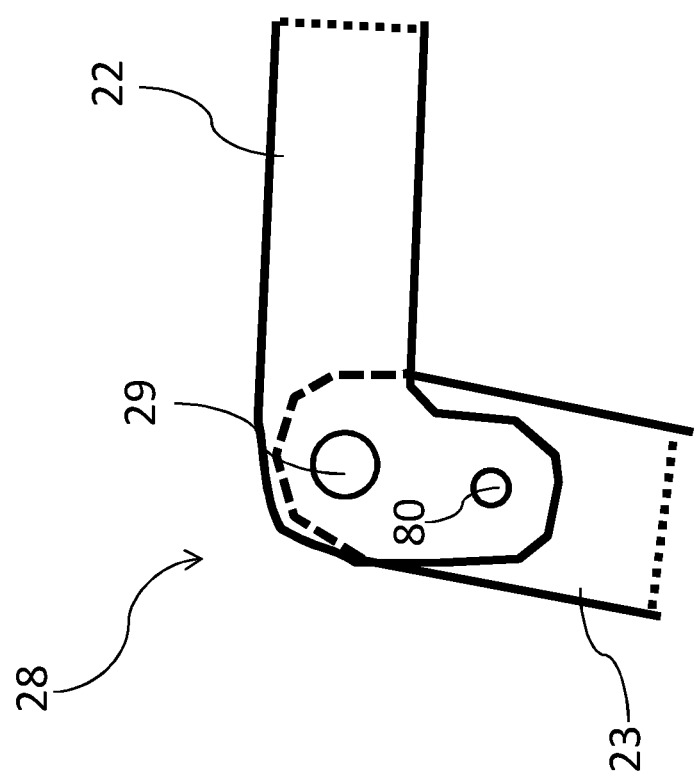
FIG. 2 illustrates an enlarged view of a rotary joint with twist prevention in normal operation.

In contrast, the rotary joints 27 and 28 between the displacement element 23 and the pivot elements 21, 22 are formed by hinges in this embodiment. The actuator 20 is thus formed by three separate members. A first member forms the displacement element. A further two members form a pivot element and a reinforcing element in each case, which are connected to one another via a material portion having a lower rigidity. By way of example, FIG. 2 shows an enlarged view of a schematically illustrated hinge 28 having twist prevention. The connecting element 23 and the pivot element 22 here are mounted in a jointed manner in the hinge by a bolt 29. The rotary axes of the rotary joints 27 and 28 also extend in the Y direction. So that the two elements 22, 23 cannot twist with respect to one another in normal operation, a shear pin 80 is provided as a blocking means, which shear pin blocks the joint in this position. This shear pin 80 can be made for example from a plastics material which gives way under certain shear forces. It is, for example, possible to use a polyamide such as nylon here. If the displacement element 23 and the pivot element 22 are twisted with respect to one another under high forces, the shear pin 80 gives way and the blocking action is terminated.

Such high forces occur if, in the event of a frontal impact to the motor vehicle, a gearbox housing 40 moves in the X direction toward the actuator 20. FIG. 1 shows a brake booster 10 having an actuator 20 in normal operation of the associated motor vehicle. In this example, a gearbox housing 40 is located at a spacing from the actuator 20. For drawing simplicity, only that side of the gearbox housing 40 which faces the brake booster 10 is illustrated. The front of the vehicle is located on the left in the illustration of FIG. 1, which means that the gearbox housing 40 moves toward the brake booster 10 in the event of a frontal impact to the vehicle.

The actuator 20 is mounted below the brake booster 20 such that its upper rotary joint 28 faces in the direction of the underside of the brake booster 20. The upper pivot element 22 furthermore has an angled design in the region of this rotary joint 28, whereby a contact surface 24 is formed which faces toward the brake booster 10. In normal operation of the motor vehicle, the rotary joint 28 and the contact surface 24 are in contact with the underside of the brake booster 20 or are located at a slight spacing from the underside of the brake booster 20. The actuator 20 projects from the bulkhead 30 and is held in this position. The lower rotary joint 27 is located nearer to the gearbox housing 40 here than the upper rotary joint 28. The horizontal spacing between the two rotary joints 27, 28 is denoted by B in FIG. 1.

Figure 3:
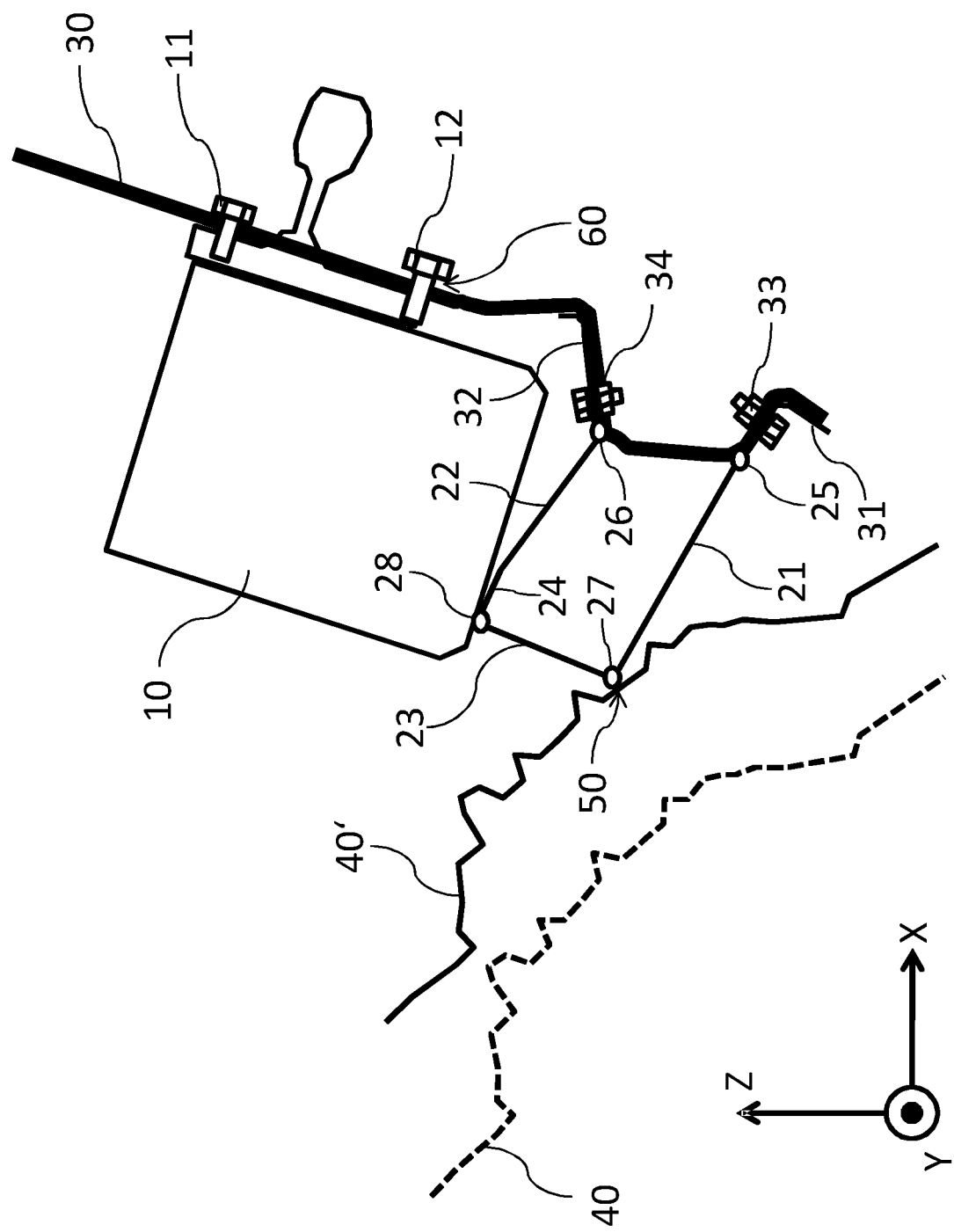
FIG. 3 illustrates a gearbox housing upon first contact with a brake booster having an actuator according to FIG. 1.

In the event of a frontal impact to the vehicle, the gearbox housing moves toward the actuator 20 until it makes contact with the actuator 20. In this position, the gearbox housing in FIG. 3 is denoted by the reference sign 40', while its original position 40 is illustrated by dashed lines. The first contact takes place in the region of the lower rotary joint 27 or the lower pivot element 21 of the actuator 20 at a first contact point 50. In the illustration of FIG. 3, the actuator 20 has already pivoted somewhat upwards in the rotary axes 25, 26 and has contacted the underside of the brake booster 10. The contact surface 2 of the actuator 20 has contacted the brake booster 10 here.

Figure 4:
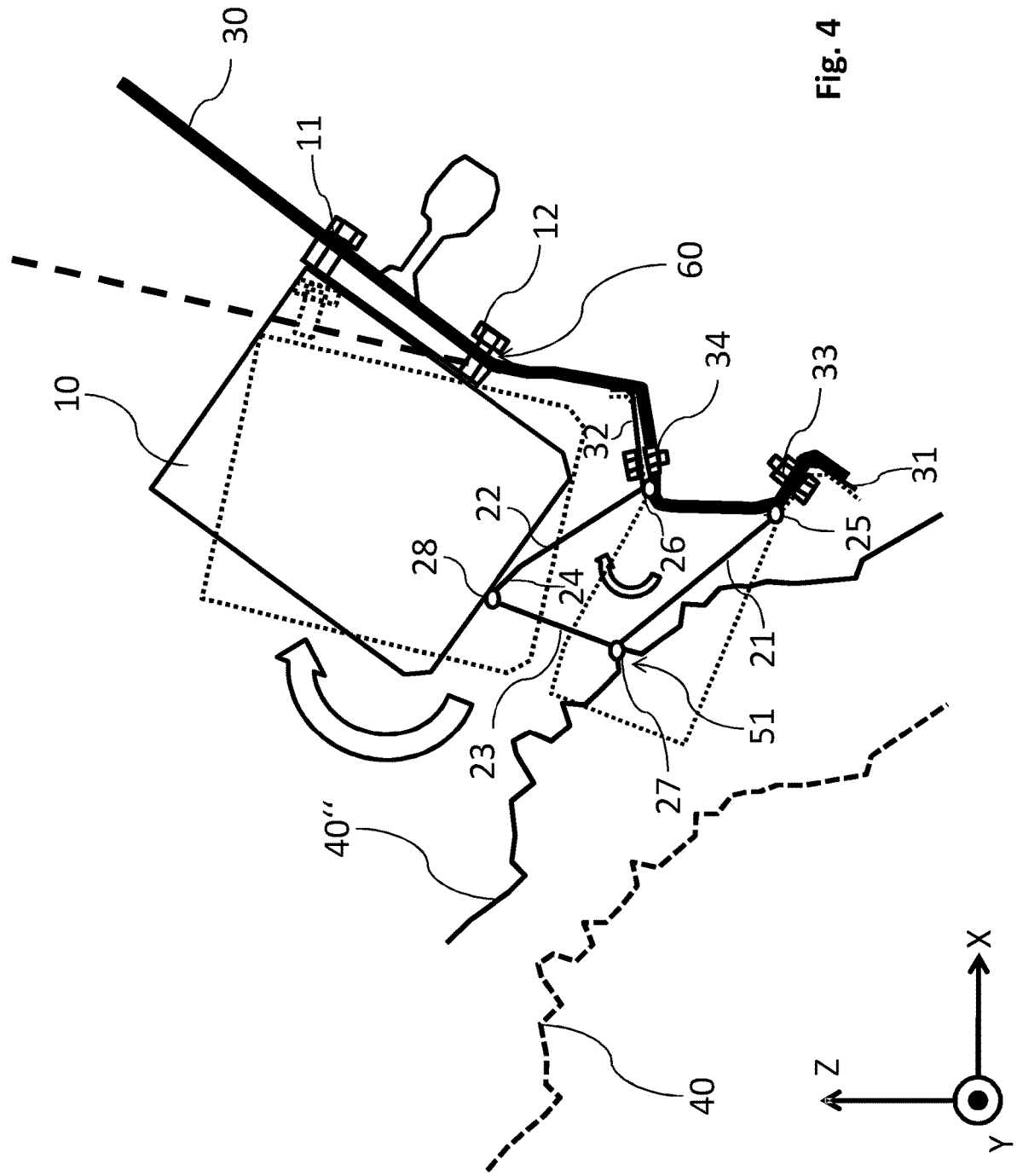
FIG. 4 illustrates a brake booster according to FIG. 1 after the deflection of the brake booster by the actuator according to a first embodiment.

In an exemplary non-limiting embodiment, the further movement of the gearbox housing into a position 40" can be seen in FIG. 4. The actuator 20 has been pivoted upwards about the rotary axes 25, 26 in the direction of the brake booster 10 as a result of the force effect of the gearbox housing 40", as indicated by a smaller rotation arrow. The elements of the actuator 20 have folded here. The rotary joint 28 and the contact surface 24 have pushed the underside of the brake booster 10 upwards, whereby a rotation of the brake booster 10 about a tilting axis 60 has been brought about (larger rotation arrow). In contrast, the original position of the brake booster 10 is illustrated by dashed lines. The same applies for the original position of the actuator 20.

The tilting axis 60 extends in the Y direction and is located in the region of the bulkhead 30. It is furthermore located in the region of a lower fastening point 12. In this position, the gearbox housing 40" abuts against the actuator 20 at a second contact point 51. For a rotation of the brake booster 10 about the tilting axis 60, the bulkhead 30 has deformed in the region of the brake booster 10 as a result of having given way in the direction of the passenger compartment. In contrast, the original extent of the bulkhead 30 is illustrated by dashed lines. The rotation of the brake booster 10 can furthermore bring about or require that the fastening points have become detached or at least been significantly deformed.

The force of the gearbox housing 40" in the X direction has therefore been converted by the actuator 20 into a force on the brake booster 10 in the Z direction. In FIG. 4, the gearbox housing 40" is shown in the position in which a twisting of the brake booster has taken place, i.e. upon twisting contact with the actuator 20. In this position of the brake booster 10, the load path between the gearbox housing 40" and the brake booster 10 in the X direction can be lifted. The gearbox housing 40" can move below the brake booster 10 or the brake booster 10 can slide with its underside along the upper side of the gearbox housing 40".

Figure 5:
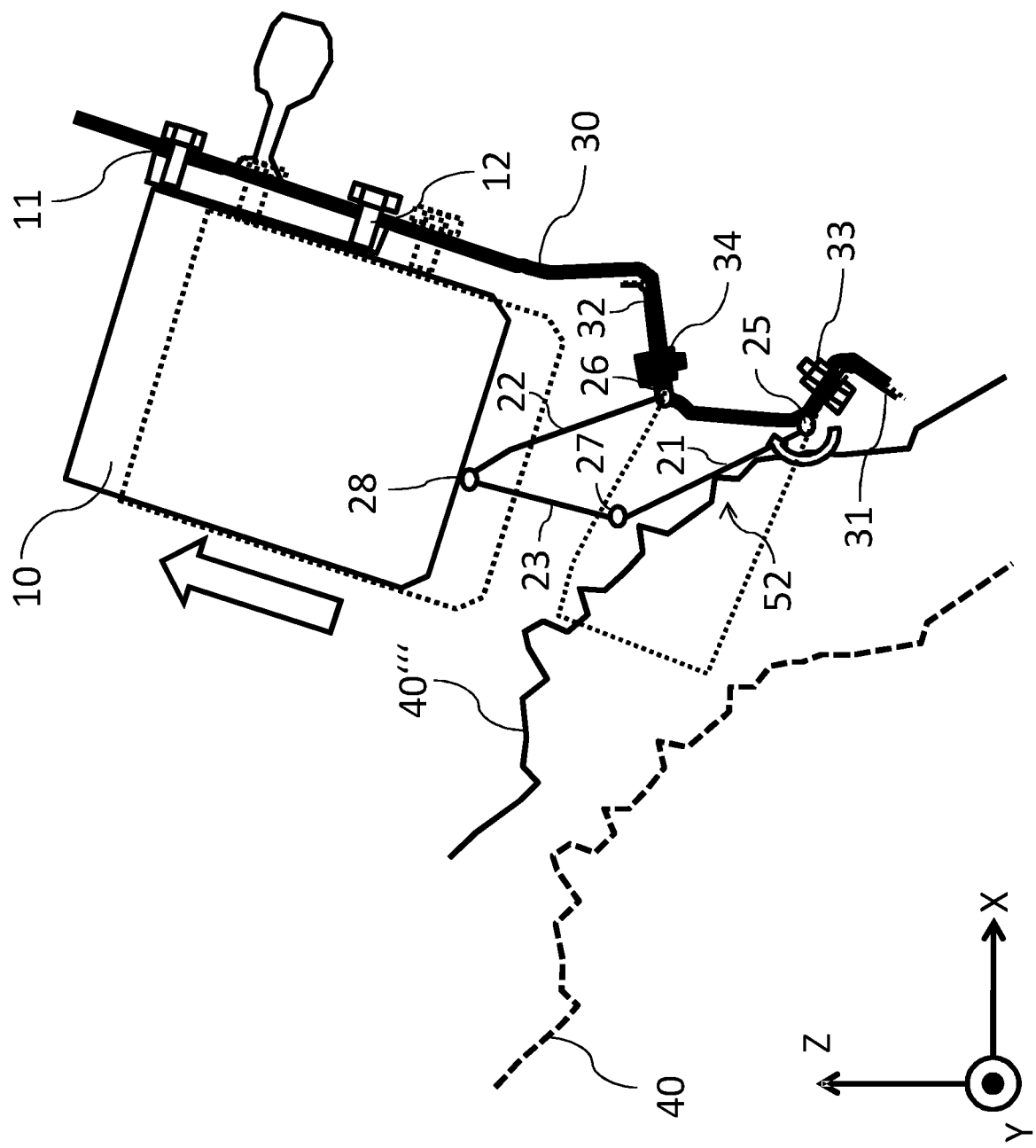
FIG. 5 illustrates a brake booster according to FIG. 1 after the deflection of the brake booster by the actuator according to a second embodiment.

FIG. 5 shows another exemplary non-embodiment, in which the brake booster 10 is not rotated about a rotary axis by the actuator 20, but is displaced in the Z direction. After a first contact between the gearbox housing and the actuator 20, the gearbox housing 40''' moves into a position in which it contacts the actuator 20 at a third contact point 52 and has likewise pivoted it about the rotary axes 25, 26 in the direction of the underside of the brake booster 10 (smaller arrow). This third contact point 52 is located in the region of the lower pivot element 21. Through contact with the rotary joint 28, the brake booster 10 has been displaced upwards along the bulkhead 30 in the Z direction (straight arrow). In contrast, the original position of the brake booster 10 is illustrated by dashed lines. The same applies again for the original position of the actuator 20.

The force of the gearbox housing 40''' in the X direction has also been converted into a force on the brake booster 10 in the Z direction here by the actuator 20 and, in this position of the brake booster 10, the load path between the gearbox housing 40''' and the brake booster 10 in the X direction is lifted. The gearbox housing 40''' can move under the brake booster 10 or the brake booster 10 slides with its underside along the upper side of the gearbox housing 40'''. In FIG. 5, the gearbox housing 40''' is shown in the position in which a displacement of the brake booster has taken place, i.e. upon displacement contact with the actuator 20.

Due to the slope of the bulkhead 30, the displacement of the brake booster 10 also has a component in the X direction. It is, however, significant that the underside of the brake booster 10 is now located higher than before. This can bring about or require that the fastening points have detached or are at least significantly deformed. In contrast, a significant deformation of the bulkhead is not brought about. To enable a controlled displacement of the brake booster 10 along the bulkhead 30, it is for example possible to form special fastening points. In particular, this refers to screw connections which, as of a certain force in the longitudinal direction of an elongated hole, can alter their position within the elongated hole.

By way of example, FIGS. 6A and 6B show such an embodiment of a fastening point 12 having an elongated hole 70. The elongated hole 70 is located in the bulkhead, although it can also be located in a housing wall of the brake booster. The brake booster can furthermore be mounted on the bulkhead by a plurality of these fastening points. The inner contour of the elongated hole 70 has two lateral narrowed portions 71 and 72. As a result of these narrowed portions, two hole regions 74 and 75 are formed within the elongated hole 70 and the longitudinal direction of the elongated hole 70 extends in the Z direction. The hole region 74 is therefore located below the hole region 75. The brake booster is connected to the bulkhead by a screw connection 73, which is illustrated in a simplified manner. After the assembly of the brake booster, this screw connection 73 is located in the lower hole region 74, as is shown in FIG. 6A. In this state, the narrowed portions 71, 72 form a defined assembly position for the screw connection 73.

If the brake booster is moved significantly upwards in the Z direction by the force of the actuator, the screw connection 73 is pushed against the narrowed portions 71, 72. These narrowed portions 71, 72 deform as of a certain force or they are destroyed and the screw connection 73 moves from the lower hole region 74 into the upper hole region 75. It is thus possible to achieve a controlled displacement of the brake booster along one or more elongated holes.

The embodiments of FIGS. 4 and 5 can also be combined so that the brake booster can be both rotated and displaced in the Z direction by the actuator.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A brake booster device, comprising:
    a brake booster mounted on a vehicle component via at least one fastening point; and
    a deformable actuator which is formed by at least two pivot elements and a displacement element, the two pivot elements are mounted at a spacing from one another on a vehicle component such that they are pivotable about respective rotary axes extending in a Y direction, the displacement element is mounted in a jointed manner between the two pivot elements,
    wherein the actuator is configured to pivot about the rotary axes of the two pivot elements under a force effect in an X direction resulting from a gearbox housing, whereby the actuator applies a force to the brake booster in a Z direction, as a result of which the position of the brake booster is alterable, wherein the actuator is mounted below the brake booster and applies an upward force to the brake booster in the Z direction during the pivoting.

2. The brake booster device of claim 1, wherein the brake booster is rotated about a tilting axis in the Y direction as a result of the force of the actuator.

3. The brake booster device of claim 2, wherein the tilting axis is located at a fastening point of the brake booster on the vehicle component.

4. The brake booster device of claim 1, wherein the brake booster is displaced in the Z direction as a result of the force of the actuator.

5. The brake booster device of claim 1, wherein the brake booster is displaced along a surface of the vehicle component on which the at least one fastening point is located.

6. The brake booster device of claim 1, wherein a pivot element of the actuator has an angled design providing a contact surface to make contact with the brake booster.

7. The brake booster device of claim 1, wherein a plurality of rotary joints between the displacement element and the pivot elements, a plurality of rotary axes between the pivot elements and the vehicle component, or both, that are formed by material portions having a rigidity which is lower than the rigidity of the pivot elements, the displacement element, or both.

8. The brake booster device of claim 1, wherein the at least one fastening point is formed by an elongated hole having two lateral narrowed portions through which the elongated hole is divided into two mutually adjacent hole regions, wherein the longitudinal extent of the elongated hole extends in the Z direction and, upon the application of a force to the brake booster in the Z direction, a screw connection moves from a first hole region into a second hole region with a widening of the narrowed portions.

9. A method, comprising:
    pivoting a deformable actuator which is formed by at least two pivot elements and a displacement element, wherein the two pivot elements are mounted at a spacing from one another on a vehicle component such that they are pivotable about rotary axes, and the displacement element is mounted in a jointed manner between the two pivot elements, the pivoting about the rotary axes of the two pivot elements in response to a force applied by a gearbox housing in an X direction; and
    during the pivoting, using the actuator to apply a force in a Z direction to a module mounted on a bulkhead to alter a position of the module mounted on the bulkhead.

10. The method of claim 9, wherein the X direction is horizontal and the Z direction is vertical.

11. The method of claim 9, wherein the application of the force in the Z direction by the actuator to the module displaces the module in the Z direction.

12. The method of claim 9, wherein the module is a brake booster.

13. The method of claim 9, wherein the module remains attached to the bulkhead when the position of the module is altered by the actuator applying the force in the Z direction to the module.

14. A brake booster device, comprising:
a brake booster mounted on a vehicle component; and
an actuator that, in response to a force applied to the actuator by a gearbox housing, pivots to move the brake booster upward, the actuator including at least two pivot elements spaced from each other and a displacement mounted in a jointed manner between the at least two pivot elements.

15. The brake booster device of claim 14, wherein at least two pivot elements are pivotably connected to a vehicle component such that the at least two pivot elements are pivotable relative to the vehicle component about respective rotatory axes extending in a Y direction.

16. The brake booster device of claim 14, wherein the force applied to the actuator is in a horizontal force in an X direction.

17. The brake booster device of claim 14, wherein the vehicle component is a bulkhead.

18. The brake booster device of claim 14, wherein the brake booster is rotated about a rotary axis in the Y direction in response to the upward movement of the actuator.

19. The brake booster device of claim 18, wherein the brake booster slides upwards relative to the vehicle component in response to the upward movement of the actuator.

20. The brake booster device of claim 18, wherein the brake booster is displaced in a Z direction as a result of the force of the actuator.

* * * * *